United States Patent Office 2,947,750
Patented Aug. 2, 1960

2,947,750

FORMALDEHYDE ABSORPTION

William P. Gerg, Bainbridge, N.Y., assignor to The Borden Company, a corporation of New Jersey No Drawing. Filed Feb. 8, 1957, Ser. No. 638,937

3 Claims. (Cl. 260—249.6)

This invention relates to the absorption of formaldehyde in an acceptor therefor.

It is customary to produce formaldehyde by the dehydrogenation (including oxidation) of methanol in contact with air at elevated temperatures. The resulting furnace gases contain vapors of formaldehyde, methanol, water, and formic acid, the latter in small proportion, and large amounts of nitrogen and hydrogen with some oxygen. Conventional procedure includes absorption of the formaldehyde and formic acid in water, with separation of most of the methanol and the gases by any convenient method.

The formaldehyde solution so produced may be mixed with urea, to form a solution to be shipped at a concentration of formaldehyde higher than is possible when the urea is omitted, as described in U.S. Patent Re. 23,174 to Kvalnes. It is emphasized in this patent that the pH of the solution must be within the range 7.0–9.0 in order to avoid instability and opalescence of the solution.

In my copending application Serial No. 519,228, filed June 30, 1955, now abandoned, of which the present application is a continuation-in-part, I simplify the procedure of Kvalnes and also obtain an improved product. I omit the initial absorption of formaldehyde in water. I pass the hot furnace gases from the formaldehyde manufacture directly into an acceptor of which urea is an example. In this copending application I use the acceptor solution at a pH 7–9. To establish the pH of 7–9 in my system, I introduce an alkali in amount required as, for instance, alkali metal hydroxides, carbonates, or borates or triethanolamine. The results obtained are considered to be due in part at least to my introduction of the formaldehyde largely, if not substantially entirely, in monomeric form into the acceptor before the formaldehyde has been polymerized by contact with liquid water.

I have now discovered that I may further simplify and improve the operation. I may and actually do cause the hydrogen ion concentration of the acceptor solution at the time of contact with the formaldehyde to rise to more than 30 times the maximum in the process of the said application and even to more than 300,000 times the previously used minimum concentration. In other words, I maintain the acceptor solution at a pH of about 3.5–5.5.

In operating at such pH, I decrease the Cannizzaro reaction and thus decrease the formation of the undesired formic acid or formate ester; increase the stability of the concentrated solution that is the object of the invention; and decrease the buffering effect formerly introduced by the large amount of alkali required to raise the pH to 7–9. In reducing this buffering effect of sodium formate or the like, I avoid objectionable interference with the normal rate of the reaction of the formaldehyde in resin forming reactions such as the condensation of formaldehyde with urea, melamine or the like at the time of final use of the formaldehyde in making such resins. Also I decrease the amount and therefore the cost of alkali required for the establishment of the desired pH.

In proceeding as described I may make, for instance, a stable solution containing up to 60% or more of the formaldehyde and 24% of the acceptor consisting in this case of equal parts of urea and melamine, the water constituting the remainder of the solution being only 26% of the total.

Briefly stated, the invention comprises the process and the product of introducing monomeric formaldehyde directly from the furnace in which produced into an acceptor such as urea or melamine in aqueous solution at a pH of about 3.5–5.5 and at a temperature of about 50°–80° C. and continuing the contact to substantial saturation with the formaldehyde absorbed or until reaching the concentration desired.

The products of the invention include the stable solution of formaldehyde reacted with the acceptor to an extent adequate to prevent loss of formaldehyde in large amounts by volatilization and to prevent the separation of paraformaldehyde from the solution.

As to materials, the acceptor that I ordinarily use is urea. Another acceptor is melamine or a mixture of melamine and urea in any proportion. The particular acceptor chosen is the one that is to appear eventually in the finished resinous condensation product. Thus, a concentrate made for ultimate use in making a condensation product of formaldehyde and urea would include urea as the acceptor. A mixture of the two acceptors described is used if such mixture is desirable in the end use to which the concentrate is to be put.

The aldehyde to be used is formaldehyde predominantly in the gaseous form and also monomeric to the extent of 50%–90% or more. Particularly satisfactory results from the standpoint of economy or otherwise are obtained when the formaldehyde to be used is taken practically directly from the dehydrogenation or oxidation unit in which the formaldehyde is being made from methanol. Such source of formaldehyde introduces a small proportion of unconverted methanol and some water of oxidation. These materials are unobjectionable in the proportions normally present in formaldehyde from the methanol conversion. The methanol, in fact, is expelled from my acceptor solution, as the absorption of formaldehyde proceeds, due to the temperature which prevails in that solution. As an alternative source of formaldehyde I may use the formaldehyde gas mixture issuing from those processes in which methane of natural gas, butane, or the like is converted for formaldehyde.

The formaldehyde from the silver catalyst conversion of methanol, which I have used, shows on analysis about 45%–55% of formaldehyde by volume and sufficient methanol to make 100 volumes of the mixed formaldehyde and methanol. In this mixture there are large volumes of nitrogen and hydrogen, both of which are permissible in my process and escape from the system. The water content is ordinarily about 20% to 30% by weight of the methanol and formaldehyde mixture.

As to conditions of operation, the formaldehyde is introduced in such manner as to give good distribution and contact with the liquid acceptor. Thus the formaldehyde may be introduced through a sparger or into the bottom of a plate fractionating column into which the liquid acceptor is being passed from the top downward. The introduction causes mixing and close, intimate contact of the formaldehyde with the acceptor. The introduction is continued until further absorption of the formaldehyde becomes slow or the concentration of the formaldehyde reaches the level desired, normally about 2–7 moles for 1 mole of the acceptor.

The temperature of the formaldehyde as introduced into the acceptor should be high. At temperatures above 80° C., which is about my minimum, the gas is in the monomeric form predominantly, is quickly reactive with the acceptor solution and is therefore absorbed effectively therein. The temperature, on the other hand, should not be so high as to give objectionable pyrolytic decomposition of the formaldehyde and for this reason I work with the gas at a temperature not above 400° C. At temperatures of 150°–380° C., the proportion of the monomer HCHO is very large and the rate of reaction with aqueous urea, for example, is very high. As a result, this range of temperature of introduction of the formaldehyde is satisfactory for good operation.

The acceptor liquid itself is maintained at a temperature of about 50°–90° C. Below 50°, the rate of reaction of the formaldehyde is not satisfactory and time is permitted for undesired polymerization of the formaldehyde in cooled condition in contact with water. The temperature of the acceptor, on the other hand, is kept at all times at a temperature not above the boiling point under the prevailing conditions and suitably not above 90° C.

The concentration of the acceptor in the liquid into which the formaldehyde is introduced may vary considerably. It is economically desirable in using urea, for example, to work with solutions that are almost saturated at the temperatures of the acceptor solution during the absorption of the formaldehyde. Thus, I use to advantage solutions of urea of concentration 50–100 parts for 100 of water, the exact concentration being determined in part, at least, by the temperatures to be used with a particular acceptor solution. With melamine, I use a dispersion in water, such as a slurry or suspension of melamine powder in 2–4 times its weight of water.

The pH of the acceptor liquid is established and maintained at a level to cause reaction of the formaldehyde monomer with the acceptor, that is, at least 3.5. The pH is maintained at not above 5.5 in order to obtain the advantages stated above. To do this I add an alkali, such as sodium or potassium hydroxide, triethanolamine, borax, or sodium carbonate.

Atmospheric pressure is ordinarily used for evaporation of water from aqueous products. To make a concentrate containing practically no methanol, it is advantageous to distill, at the end of the formaldehyde absorption and reaction, at reduced pressure, as at the pressure of boiling at temperatures around 60°–70° C.

The contact of the formaldehyde with the selected acceptor under the conditions stated is continued until the formaldehyde is absorbed in substantial proportion. The percentage of formaldehyde that is actually absorbed is ordinarily around 50%–95% or more of the formaldehyde introduced. In operations, in which an extremely high concentration of formaldehyde is desired, I may produce absorption of percentages within the lower part of this range or even somewhat below 50% and then absorb the remainder of the formaldehyde in another solution of the acceptor for sale or use at a lower concentration of formaldehyde. Alternatively, the formaldehyde remaining from the first absorption may be absorbed in water in conventional scrubbing equipment and used as an aqueous formaldehyde solution for purposes outside the present invention.

The equipment used is conventional in reacting gases with liquids or in gas absorption and, therefore, is not illustrated.

The invention will be further illustrated by description in connection with the following specific examples of the practice of it. In these examples and elsewhere herein, proportions are expressed as parts by weight except when specifically stated to the contrary.

*Example 1*

A solution of 18 lbs. of urea in 57 lbs. of water was charged to a 10 gal. vessel or pot fitted with a packed column 12 ft. high and 8 in. diameter. The solution in the vessel was continuously circulated through the column by a circulating pump. The pH was continuously adjusted to and maintained within the range 4–5 by the manual addition of sodium hydroxide as required. Gases from an industrial formaldehyde converter (dehydrogenator) were introduced at a temperature of about 300° C. below the surface of the liquid in the vessel through a sparger. A representative sample of the gases so introduced contained formaldehyde 22%, methanol 12%, water 10%, and non-condensable gases (mostly nitrogen) 56%. The temperature of the acceptor solution was maintained at 80°–90° C.

In the absorption of the formaldehyde from the converter gas, the monomeric formaldehyde reacts after the start of a run, not only with urea but also with urea formaldehyde condensed to low degree at least in a previous stage of the run, all in aqueous solution.

The unabsorbed portion of the converter gas and vapors from the tower are passed through a cooled condenser. Condensed reactants (formaldehyde) and other vapors may be recycled to the formaldehyde converter.

Introduction of the gases was continued for 24 hours, until the free formaldehyde (by the sulfite method) was 31% of the weight of the solution in the vessel. The solution then had the following analysis: total formaldehyde 49%, urea 16%, methanol 12%, and water (by difference) 23%.

This solution was then vacuum distilled to give a concentrated product of the following composition: total formaldehyde 59.7%, urea 22.7%, water (by difference) 17.6%, pH 5.1. This solution is stable and remains clear for a period of time in excess of six months at temperatures in the range of 50°–110° F. The remaining solution was further vacuum concentrated to give a viscous, clear syrup containing substantially no water and containing formaldehyde 67% and urea 32%. This syrup product is dilutable with water without precipitation.

The product is useful for resin manufacture, additional urea being added if desired and condensation being effected in the usual manner.

*Example 2*

The apparatus and conditions of Example 1 except as noted are used. The urea solution is introduced continuously at the top of the column and the product withdrawn continuously from the pot at approximately 35% formaldehyde, 14% urea. In other words, streams of gas containing formaldehyde and of the acceptor move countercurrently, in contact and continuously.

This product is vacuum distilled to remove methanol and water in a separate still.

*Example 3*

The procedure of Example 1 is followed except that a suspension of melamine in water is substituted for urea on an equivalent basis, that is, 42 parts of melamine for 30 of urea.

The product is a highly concentrated formaldehyde product. Additional melamine may be added and the whole then condensed to a formaldehyde melamine resin.

*Example 4*

Into the final product of Example 1, in hot condition, there was added and mixed an approximately equal weight of 50% formaldehyde in water at a temperature of about 80° C. up to the boiling point of approximately 100° C. The resulting solution contained total formaldehyde 54%, free formaldehyde 33%, and urea 15%. The solution was stable at pH 5.8 against separation of paraformaldehyde and the stability persisted on storage at 50°–110° F. temperatures.

It will be observed that 1 part of urea stabilized 3.6 times its weight of total formaldehyde. By contrast, a representative conventional solution of formaldehyde stabilized by urea contains approximately 59% of total formaldehyde to 24% of urea. In other words, this solution requires 1 part of urea to stabilize 2.46 parts of formaldehyde.

In this example the temperature of mixing of the components may be varied provided it is kept above the temperature at which paraformaldehyde will separate from the added urea solution in advance of the stabilizing reaction.

Example 5

This example relates to the continuous manufacture of finished resins. To 100 parts of the product of Example 2 were added 21 parts of urea, to yield a solution containing 29% formaldehyde and 29% urea. This solution is then continuously charged to a wel stirred reactor vessel of such volume that it is filled in about 1 hour. While the solution is being charged the pH is adjusted to 5.6–5.8. The product is continuously withdrawn and neutralized.

The product of this example is useful as an adhesive for wood, a binder for foundry sand cores, and paper sizing.

Example 6

A slurry of 15 parts melamine in 50 of water was charged into the apparatus described in Example 1. The pH was adjusted to and maintained in the range 4.0–5.0 with small amounts of sodium hydroxide. Gases from the formaldehyde convertor were introduced, at about 300° C., below the surface of the liquid through a sparger. When the temperature reached 50° C., the solution became clear. When the temperature of the absorbing solution reached 80° C., this temperature was maintained throughout the remainder of the absorbing cycle by cooling. The absorption of the gases was continued until the free formaldehyde content was 26% of the weight of the solution in the vessel. At this stage the solution had the following composition: total formaldehyde 36.65%, melamine 0.75%, methanol 15.1%, water (by difference) 47.5%.

Further concentration by vacuum distillation gave a product having the following composition: total formaldehyde 45.8%, melamine 0.9%, and water (by difference) 53.3%. The pH of the resultant solution was 4.8. This solution exhibits excellent stability in spite of the very low proportion of melamine and the high proportion of formaldehyde present.

It will be understood that it is intended to cover all changes and modifications of the examples of the invention herein chosen for the purpose of illustration which do not constitute departures from the spirit and scope of the invention.

What is claimed is:

1. The method of absorbing and concentrating formaldehyde, which comprises oxidizing methanol in a furnace to form a gaseous mixture containing formaldehyde in pre dominantly monomeric form, introducing said gaseous mixture at a temperature of about 150°–380° C. into an aqueous dispersion of an acceptor selected from the group consisting of urea and melamine, said dispersion being maintained at a temperature of about 50°–90° C. and a pH approximately within the range 3.5–5.5, and continuing the introduction of the gaseous formaldehyde into said acceptor dispersion to form a clear stable solution containing at least 2–7 moles of formaldehyde to 1 mole of the acceptor.

2. The process of claim 1 in which the acceptor dispersion is an aqueous solution of urea.

3. The process of claim 1 in which the acceptor dispersion is a suspension of melamine in water.

References Cited in the file of this patent

UNITED STATES PATENTS

| Re. 23,174 | Kvalnes | Nov. 29, 1949 |
| 2,415,705 | Rohner et al. | Feb. 11, 1947 |
| 2,625,524 | Kvalnes | Jan. 13, 1953 |
| 2,729,611 | Chesley et al. | Jan. 3, 1956 |
| 2,763,649 | Albrecht | Sept. 18, 1956 |

FOREIGN PATENTS

| 515,623 | Belgium | Dec. 15, 1952 |

OTHER REFERENCES

Walker: Formaldehyde, pages 35 and 47 (1953).
Goldschmidt: Ber. Deut. Chem., vol. 29, pp. 2438–39 (1896).
Vass: British Plastics, vol. 10, pp. 115–118 (1938).
Yee et al.: Ind. and Eng. Chem., vol. 40, pp. 1178–83 (1948).